(12) United States Patent
Wang et al.

(10) Patent No.: US 11,308,404 B2
(45) Date of Patent: Apr. 19, 2022

(54) SYNTHESIZING HIGH-FIDELITY SIGNALS WITH SPIKES FOR PROGNOSTIC-SURVEILLANCE APPLICATIONS

(71) Applicant: Oracle International Corporation, Redwood Shores, CA (US)

(72) Inventors: Guang C. Wang, San Diego, CA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 800 days.

(21) Appl. No.: 16/215,345

(22) Filed: Dec. 10, 2018

(65) Prior Publication Data

US 2020/0184351 A1    Jun. 11, 2020

(51) Int. Cl.
*G06N 5/04* (2006.01)
*G01R 23/20* (2006.01)
*H04L 9/40* (2022.01)
*H04L 29/06* (2006.01)

(52) U.S. Cl.
CPC .............. *G06N 5/04* (2013.01); *G01R 23/20* (2013.01); *H04L 63/1425* (2013.01)

(58) Field of Classification Search
None
See application file for complete search history.

(56) References Cited

U.S. PATENT DOCUMENTS

2018/0060151 A1 *   3/2018   Gross .................... G06N 20/00

* cited by examiner

*Primary Examiner* — Raul J Rios Russo
*Assistant Examiner* — Carl F. R. Tchatchouang
(74) *Attorney, Agent, or Firm* — Park, Vaughan, Fleming & Dowler LLP

(57) ABSTRACT

The system receives original time-series signals from sensors in a monitored system. Next, the system detects and removes spikes from the original time-series signals to produce despiked original time-series signals, which involves using the original time-series data to optimize a damping factor, which is applied to a threshold for a spike-detection technique, and using the spike-detection technique with the optimized damping factor to detect the spikes. The system then generates despiked synthetic time-series signals, which are statistically indistinguishable from the despiked original time-series signals. The system also includes synthetic spikes, which have the same temporal, amplitude and width distributions as the spikes in the original time-series signals, in the despiked synthetic time-series signals to produce synthetic time-series signals with spikes. The system uses the synthetic time-series signals with spikes to train an inferential model, and uses the inferential model to perform prognostic-surveillance operations on subsequently-received signals from the monitored system.

20 Claims, 14 Drawing Sheets
(4 of 14 Drawing Sheet(s) Filed in Color)

SYNTHESIZING HIGH-FIDELITY SIGNALS WITH SPIKES FOR PROGNOSTIC-SURVEILLANCE APPLICATIONS

BACKGROUND

Field

The disclosed embodiments generally relate to techniques for performing prognostic-surveillance operations based on time-series sensor signals. More specifically, the disclosed embodiments relate to a technique for synthesizing high-fidelity time-series sensor signals including spikes to facilitate prognostic-surveillance operations for monitored systems.

Related Art

Complex systems, such as electrical generation plants, include numerous components, such as pumps, turbines and transformers, which routinely degrade over time and fail. In these types of systems, it is advantageous to proactively monitor components to detect degradation early on, which makes it possible to fix impending problems while they are small.

This type of proactive surveillance operates by monitoring time-series signals from sensors in critical systems, wherein the time-series signals includes various parameters, such as temperatures, vibrations, voltages and currents. The time-series signals are then analyzed using prognostic-surveillance techniques to detect subtle degradation modes at the earliest incipience of the degradation.

Researchers have begun investigating the possibility of using recently-developed machine-learning (ML) techniques to perform such prognostic-surveillance operations. However, in order to develop these ML techniques, researchers need to be able to obtain real time-series data to evaluate the ML techniques in terms of quantitative performance metrics. Unfortunately, the time-series data associated with such systems is often subject to privacy agreements and security policies, which make it impractical to use the real measured signals for research purposes. Also, validating certain types of error rates requires extremely-long streams of fault-free data, which are challenging to gather, store and process.

These problems can be addressed by synthesizing time-series signals having the same statistical properties as the real signals, and then using the synthesized signals to generate prognostic-surveillance models. However, conventional signal-synthesis techniques cannot accommodate time-series signals containing spikes in the signals. The best existing technique for handling signals containing spikes is the Goring and Nikora spike-detection technique. (See Goring, Derek G., and Nikora, Vladimir I. "Despiking Acoustic Doppler Velocimeter Data." Journal of Hydraulic Engineering 128.1 (2002): 117-126.)

Unfortunately, existing techniques for handling spikes have limitations that preclude using them for high-fidelity reconstruction of synthesized signals. In some signals, two or more wide or moderately-wide spikes can superimpose and "fool" conventional spike-detection techniques into counting superimposed spikes as one very wide meta-spike. Also, in cases where the "base signals" are noisy and the height-to-width ratios for the spikes are smaller (e.g., within two standard deviations of the noise for the base signal), conventional spike-detection techniques exhibit poor performance.

The fundamental shortcoming of conventional spike-detection techniques is that they try to detect changes in signal quality that are "abnormal" with respect to the variance of the base signal just before and just after spikes. This leads to undesirable effects, the most important of which is that spikes are often the biggest contributors to signal variance. Consequently, a signal from a time-series process that has a lot of spikes (or fewer spikes but with very large amplitudes) will have a high variance. As a consequence, when conventional spike-detection techniques are used in circumstances where variance is large (as is the case when signals contain lots of spikes, or less-frequent spikes with very large amplitudes), conventional techniques become less sensitive to detecting smaller spikes. While this did not matter when Goring and Nikora were developing their spike-detection technique for acoustic signature analysis, for other use cases, the smaller spikes that are missed by conventional spike-detection techniques can indicate degradation mechanisms that are problematic for business-critical assets.

Hence, what is needed is a technique for synthesizing representative time-series signals including spikes without the shortcomings of existing spike-detection and synthesis techniques.

SUMMARY

The disclosed embodiments relate to a system that performs prognostic-surveillance operations on a monitored system. During operation, the system receives original time-series signals from sensors in the monitored system. Next, the system detects and removes spikes from the original time-series signals to produce despiked original time-series signals, wherein detecting the spikes involves using the original time-series data to optimize a damping factor, which is applied to a threshold for a spike-detection technique, and using the spike-detection technique with the optimized damping factor to detect the spikes. The system then generates despiked synthetic time-series signals, which are statistically indistinguishable from the despiked original time-series signals. Next, the system includes synthetic spikes, which have the same temporal distribution, amplitude distribution and width distribution as the spikes in the original time-series signals, in the despiked synthetic time-series signals to produce synthetic time-series signals with spikes. The system then uses the synthetic time-series signals with spikes to train an inferential model, and uses the inferential model to perform prognostic-surveillance operations on subsequently-received time-series signals from the monitored system.

In some embodiments, while optimizing the damping factor, the system first uses the spike-detection technique with an initial damping factor to detect and remove the spikes from the original time-series signals to produce despiked original time-series signals. Next, the system generates despiked synthetic time-series signals, which are statistically indistinguishable from the despiked original time-series signals. The system then includes synthetic spikes in the despiked synthetic time-series signals to produce ground truth synthetic time-series signals, wherein the synthetic spikes have slightly expanded and contracted temporal distributions, amplitude distributions and width distributions with respect to the spikes in the original time-series signals. Next, the system performs tests, which involve varying the damping factor while using the spike-detection technique to detect spikes in the ground truth synthetic time-series signals. Finally, the system determines an optimized damping factor based on true and false detections resulting from the tests.

In some embodiments, the spike-detection technique comprises a phase-space thresholding technique, which uses a phase-space-related threshold.

In some embodiments, the spike-detection technique comprises an acceleration-thresholding technique, which uses an acceleration threshold.

In some embodiments, the spike-detection technique comprises a wavelet-thresholding technique, which uses a wavelet-space-related threshold.

In some embodiments, generating the despiked synthetic time-series signals involves: decomposing the despiked original time-series signals into deterministic and stochastic components; and using the deterministic and stochastic components to produce the despiked synthetic time-series signals.

In some embodiments, the despiked synthetic time-series signals have the same serial-correlation structure, cross-correlation structure, and stochastic content as the despiked original time-series signals.

In some embodiments, the stochastic content includes one or more of the following: a mean; a variance; a skewness; a kurtosis; and Kolmogorov-Smirnov test statistics.

In some embodiments, generating the despiked synthetic time-series signals involves using a telemetry parameter synthesis (TPSS) technique, which creates a high-fidelity synthesis equation, and then uses the high-fidelity synthesis equation to produce the despiked synthetic time-series signals.

In some embodiments, while using the TPSS technique to produce the despiked synthetic time-series signals, the system uses an autocorrelation technique to determine a longest period for each signal in the despiked original time-series signals. Next, the system selects a portion of the despiked original time-series signals that contains an integer number of periods. The system then determines a number of Fourier modes $N_{mode}$, which equals a number of peaks in a spectral-density function for the despiked original time-series signals. Finally, the system selects the maximum $N_{mode}$ Fourier modes, and then uses the selected $N_{mode}$ Fourier modes to produce the despiked synthetic time-series signals.

In some embodiments, while using the inferential model to perform prognostic-surveillance operations on the subsequently-received time-series signals, the system uses the prognostic inferential model to generate estimated values for the subsequently-received time-series sensor data. Next, the system performs a pairwise differencing operation between actual values and the estimated values for the subsequently-received time-series sensor data to produce residuals. Finally, the system performs a sequential probability ratio test (SPRT) on the residuals to detect the incipient anomalies.

In some embodiments, detecting the incipient anomalies comprises detecting an impending failure of the monitored system.

In some embodiments, detecting the incipient anomalies comprises detecting a malicious-intrusion event in the monitored system.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
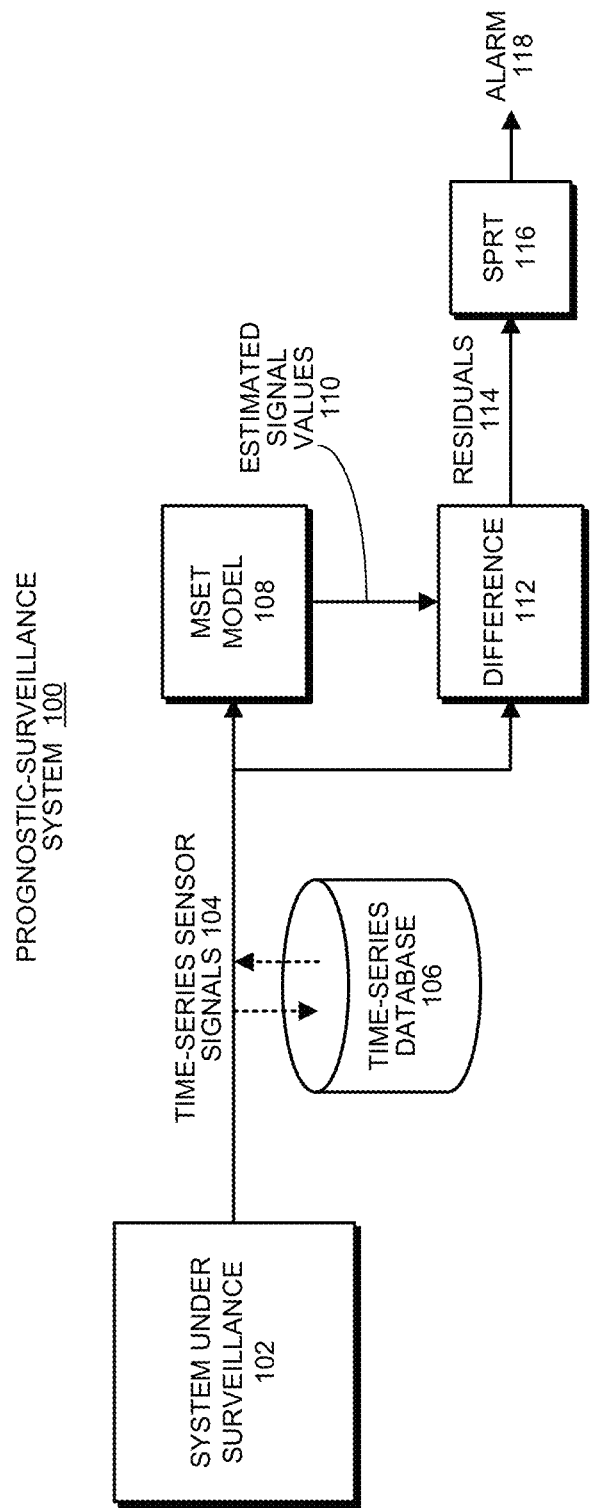
FIG. 1 illustrates an exemplary prognostic-surveillance system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Conventional approaches for detecting spikes are good at detecting "needle spikes" in time-series signals, but perform poorly for "wide" spikes, and for spikes where the "height-to-base ratio" is small in comparison to the standard deviation of the "base" unspiked signal. Conventional approaches perform especially poorly for signals with overlapping spikes, wherein two or more overlapping spikes are often classified as one large "metaspike."

To address these shortcomings of conventional spike-detection techniques, the disclosed embodiments provide an iterative parametric procedure, which possesses novel characteristics, including the ability to: (1) detect both large spikes and small spikes with high sensitivity; (2) reproduce the temporal distribution of the spikes; (3) handle overlapping spikes; and (4) operate in the frequency domain. The ability to operate in the frequency domain facilitates automated detection of spikes in the Power Spectral Density (PSD) of FFT spectra, where the spikes signify periodicities in the time-series signals, and where the widths, heights, and areas-under-the-spikes vary dramatically with sampling densities and associated physics phenomena, and where conventional spike-detection methods misidentify important periodicities.

The disclosed embodiments provide a new automated, signal-synthesis technique, which employs an iterative procedure for synthesizing time-series signals containing spikes. As mentioned above, the Goring and Nikora technique works well for detecting individual "needle spikes." However, it performs poorly for signals with "longer period fluctuations," which are commonly classified as wide spikes. The default phase-space threshold in the classical Goring and Nikora technique is a function of the number of observations (i.e., sampling rate) and the standard deviation for the signal. However, when spikes become wide, the standard deviation becomes larger and has different characteristics. As a consequence, the thresholds derived for "needle spikes" are no longer valid, and conventional spike-detection techniques break down as the widths of the spikes increase, and in cases where two or more spikes overlap.

This new technique has a number of advantages. (1) It provides equal sensitivity for detecting large as well as small spikes. (2) It quantitatively evaluates itself and reports "spike-detection efficiency" using a Monte Carlo simulation technique. (3) The new technique also provides a high-fidelity respiking process. This respiking process operates by characterizing the temporal distribution of the spikes with respect to spike inter-arrival times (IATs), widths of both positive and negative spikes (WoP, WoN), and positive and negative amplitudes (AoP, AoN) of spikes. It then generates synthesized signals, which possess nearly identical distributions of IATs, spike widths and spike heights as the original time-series signals.

Before describing further details of this new technique, we first describe an exemplary prognostic-surveillance system in which the technique is used.

Exemplary Prognostic-Surveillance System

FIG. 1 illustrates an exemplary prognostic-surveillance system 100 that accesses a time-series database 106, containing time-series signals in accordance with the disclosed embodiments. As illustrated in FIG. 1, prognostic-surveillance system 100 operates on a set of time-series sensor signals 104 obtained from sensors in a system under surveillance 102. Note that system under surveillance 102 can generally include any type of machinery or facility, which includes sensors and generates time-series signals. Moreover, time-series signals 104 can originate from any type of sensor, which can be located in a component in system under surveillance 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from system under surveillance 102 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics*. 16 (2): 117-186.) In this way, prognostic-surveillance system 100 can proactively alert system operators of incipient anomalies, such as impending failures, hopefully with enough lead time so that such problems can be avoided or proactively fixed.

Using Synthetic Signals to Address Data Privacy and Security Concerns

Figure 2:
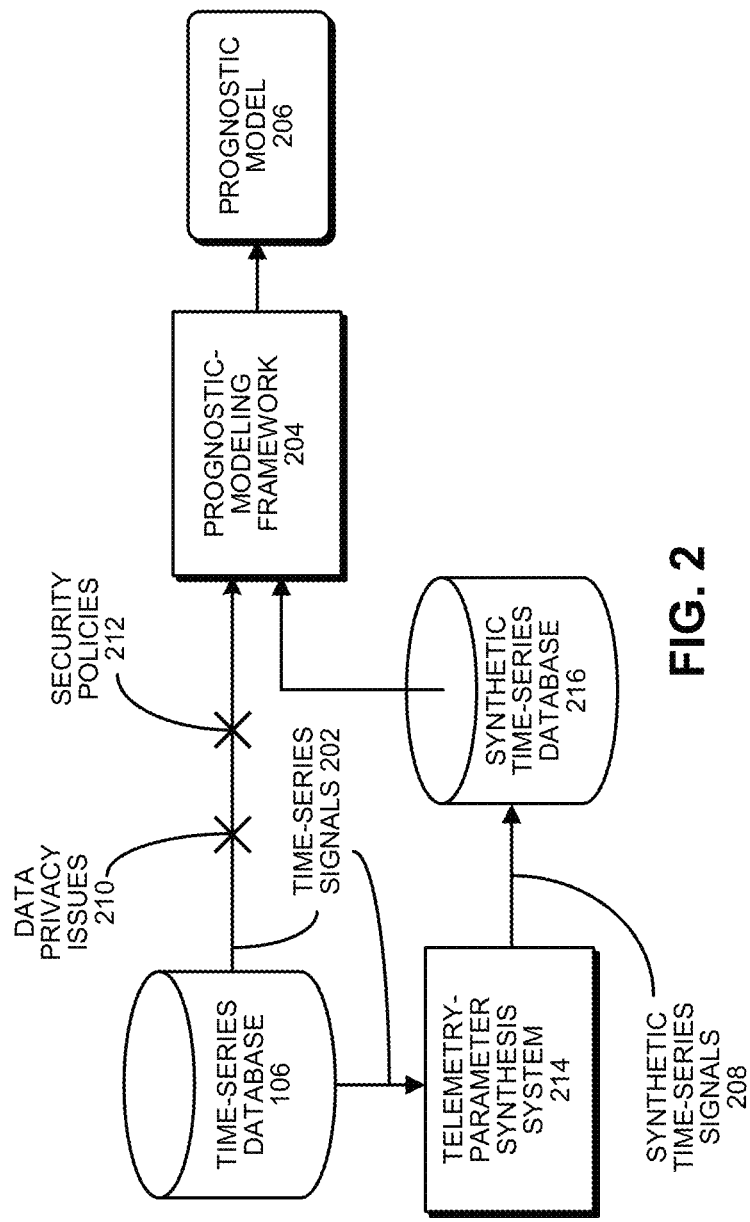
FIG. 2 illustrates data privacy and security challenges and a corresponding synthetic-signal solution in accordance with the disclosed embodiments.

FIG. 2 illustrates data privacy and security issues and a corresponding synthetic-signal solution in accordance with the disclosed embodiments. As illustrated in FIG. 2, time-series signals 202 obtained from time-series database 106 can be fed into a prognostic-modeling framework 204 to produce a prognostic model 206, which is used to facilitate subsequent prognostic-surveillance operations.

However, as illustrated in FIG. 2 data privacy issues 210 and security policies 212 can make it difficult (if not impossible) to use time-series signals 202 directly obtained from time-series database 106. So, instead of using the time-series signals 202 directly, time-series signals 202 from time-series database 106 are fed through a telemetry-parameter synthesis system (TPSS) 214 to produce synthetic time-series signals 208 which feed into a synthetic time-series database 216 that stores synthetic time-series signals, which are statistically indistinguishable from the original time-series signals, but do not contain any of the data points in the original time-series signals. These synthetic time-series signals are then fed into prognostic-modeling framework 204 to produce prognostic model 206.

Handling Spikes

We have developed a new system for handling spikes that: identifies all spikes and the times of occurrence of those spikes in the original time-series data; treats upward and downward spikes separately; computes the inter-arrival times (IATs) for both positive and negative spikes; computes the distribution of amplitudes for both positive and negative spikes; and computes the distribution of widths for the positive and negative spikes. The system then performs a despiking operation, which temporarily fills in the data points where the spikes are removed using an optimal-value imputation (OVI) technique, which replaces missing data values in the time-series data with imputed data values determined based on correlations between the signals. Note that OVI is superior to the conventional approach of using interpolation to fill in such data points. (For a description of OVI, please see U.S. Pat. No. 7,292,952, entitled "Replacing a Signal from a Failed Sensor with an Estimated Signal Derived from Correlations with Other Signals," by inventors Kenny C. Gross, et al., filed on 3 Feb. 2004, which is hereby incorporated by reference.)

The despiked signals are then run through a spectral-decomposition technique that separates the deterministic serially correlated components from the stochastic noise associated with the signals. For the deterministic components, the system decomposes the signals into an envelope of superimposed periodic waveforms. For the stochastic noise, an empirical distribution is constructed, for which the variance, skewness, and kurtosis are computed. The system then makes use of six empirical distributions for spikes (IATs of spikes, distribution of positive spikes, distribution of negative spikes, distribution of positive amplitudes, distribution of negative amplitudes, and distribution of spike widths) in a synthesis technique that superimposes stochastic noise and spikes onto the envelopes of waveforms to produce synthesized time-series signals that have the same deterministic structure and stochastic characteristics as the original time-series signals.

Figure 3:
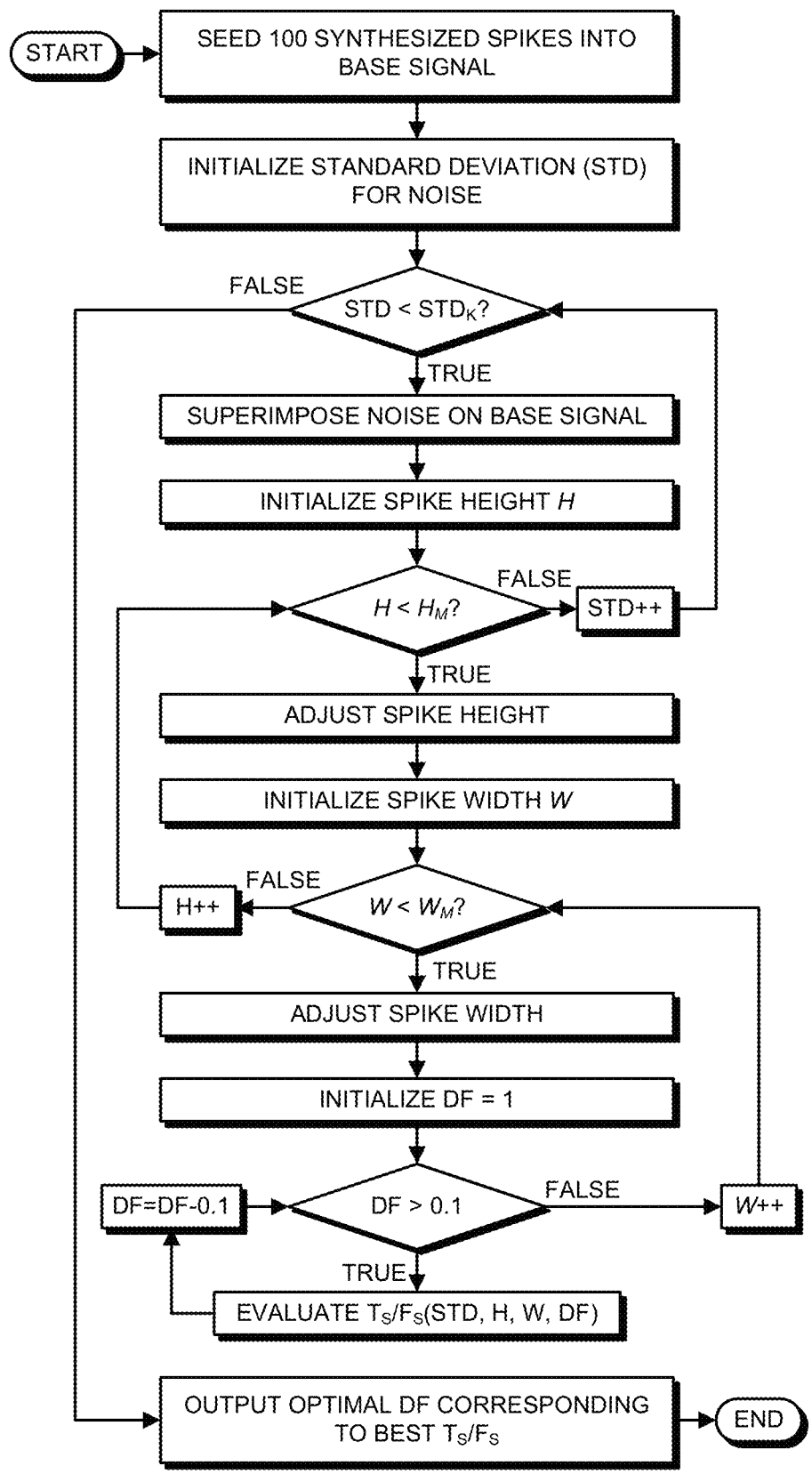
FIG. 3 presents a flow chart for a systematic parametric analysis of true and false spike detections in accordance with the disclosed embodiments.

Our new system makes use of a parametric iterative technique called "SimSpike," which is illustrated in the flow chart that appears in FIG. 3, to evaluate overall spike-detection efficiency in terms of True Detections (Ts) and False Detections (Fs) versus a newly introduced adjustable parameter we call the "damping factor" (DF). Our new system has been shown to perform near-optimal despiking and respiking for a given collection of spiky signals without knowing the locations of the true spikes ahead of time.

The damping factor DF is introduced to suppress the phase-space threshold and enhance the sensitivity for spike detection so that small, large, and overlapping spikes can be detected with equal efficiency. To understand the relationship between variations in damping factor and the resulting spike-detection performance, we use the "SimSpike" technique to identify true spike detections (Ts) and false spike detections (Fs), wherein the detection efficiency becomes a function of multiple variables. Note that the nested loop structure in FIG. 3 facilitates a comprehensive parametric investigation of the correlation between a DF value and resulting Ts/Fs ratio performance with any given set of spike characteristics (i.e., spike height, spike width, base-signal noise level, and IAT temporal distribution of the spikes).

FIGS. 4A-4D illustrate how DFs and Ts/Fs performance correlate to varying spike widths, amplitudes, and signal noise levels. In each of FIGS. 4A-4D, there are two surface plots, wherein the top plot represents the Ts value while the bottom plot represents the Fs value. The x-axis indicates the standard deviation of the noise added onto the base signal. The y-axis indicates the duration increment, which specifies the number of observation points by which the base spikes are expanded and later contracted. For example, a duration increment of 1 means all base spikes are widened by 1 extra observation point. The color represents the DF value that yields the associated Ts/Fs performance. The amplitude increment is specified at the top of each figure, and is defined as the number of observation points by which the peaks of the base heights are raised.

Figure 4A:
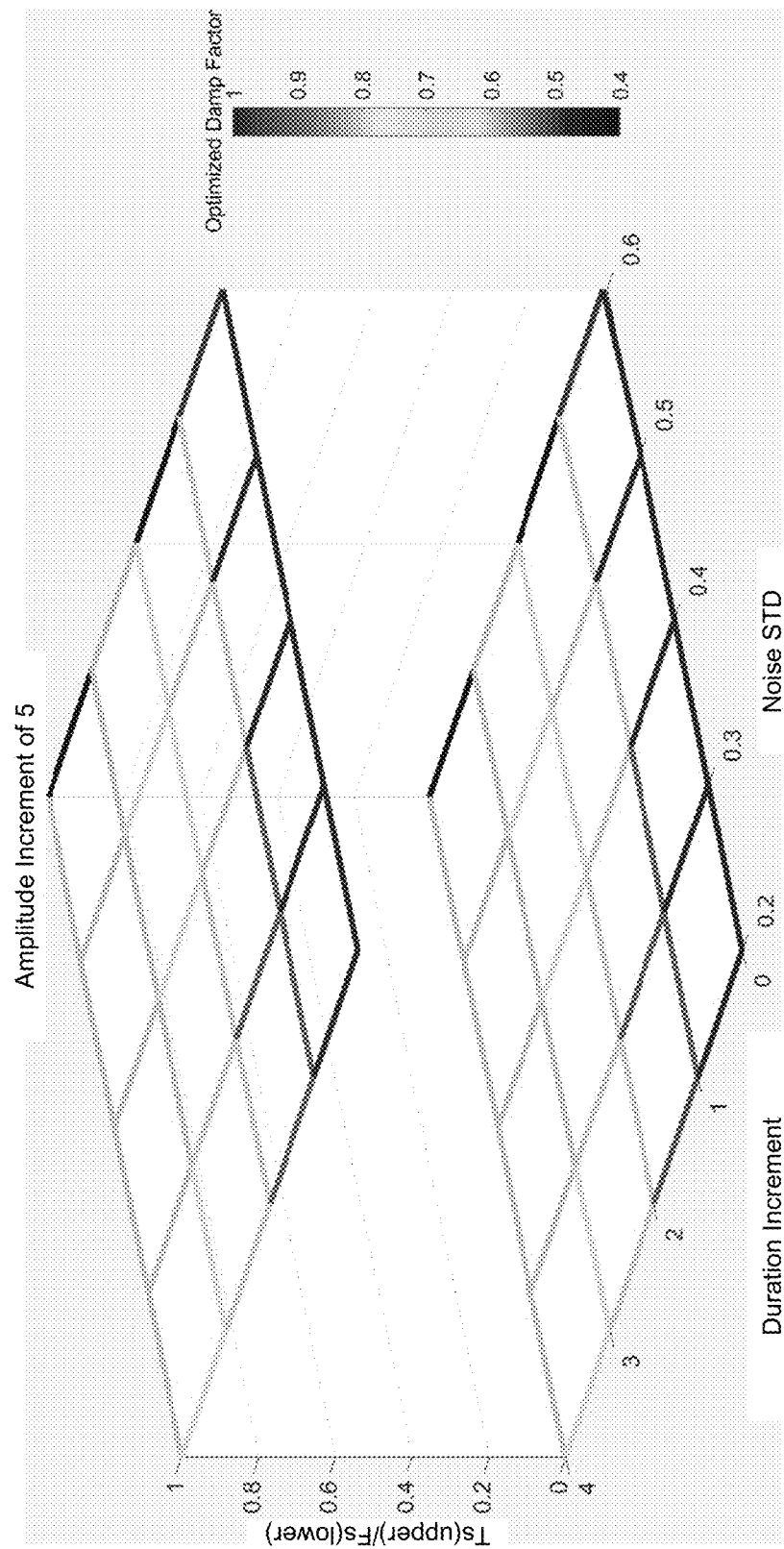
FIGS. 4A-4D present graphs characterizing spike-detection performance as a function of spike width, spike amplitude and a baseline signal noise level in accordance with the disclosed embodiments.

FIG. 4A presents the first case where the height of base spikes is increased by 5 observation points, suggesting prominent spikes in the signal. The graph in FIG. 4A indicates that if all spikes are substantially taller than variations in the base signal, it is easy to capture them all (100% Ts and 0% Fs). However, to ensure optimal performance, a range of DF values needs to be optimally analyzed from case to case. For example, on the near corner of FIG. 4A, where spikes have moderate width and signal noise is low, the optimal DF is 1.0, which indicates that suppressing the phase-space threshold is actually not necessary. In contrast, when the noise level becomes high, and/or when spikes become wider, a non-zero DF value needs to be used to make the spike-detection technique sensitive enough to capture them all. As a result, the color gradually turns from dark to light and consequently the DF is lowered to 0.4 at the far corner of FIG. 4A when the signal is noisy and the spikes are wide.

Figure 4B:
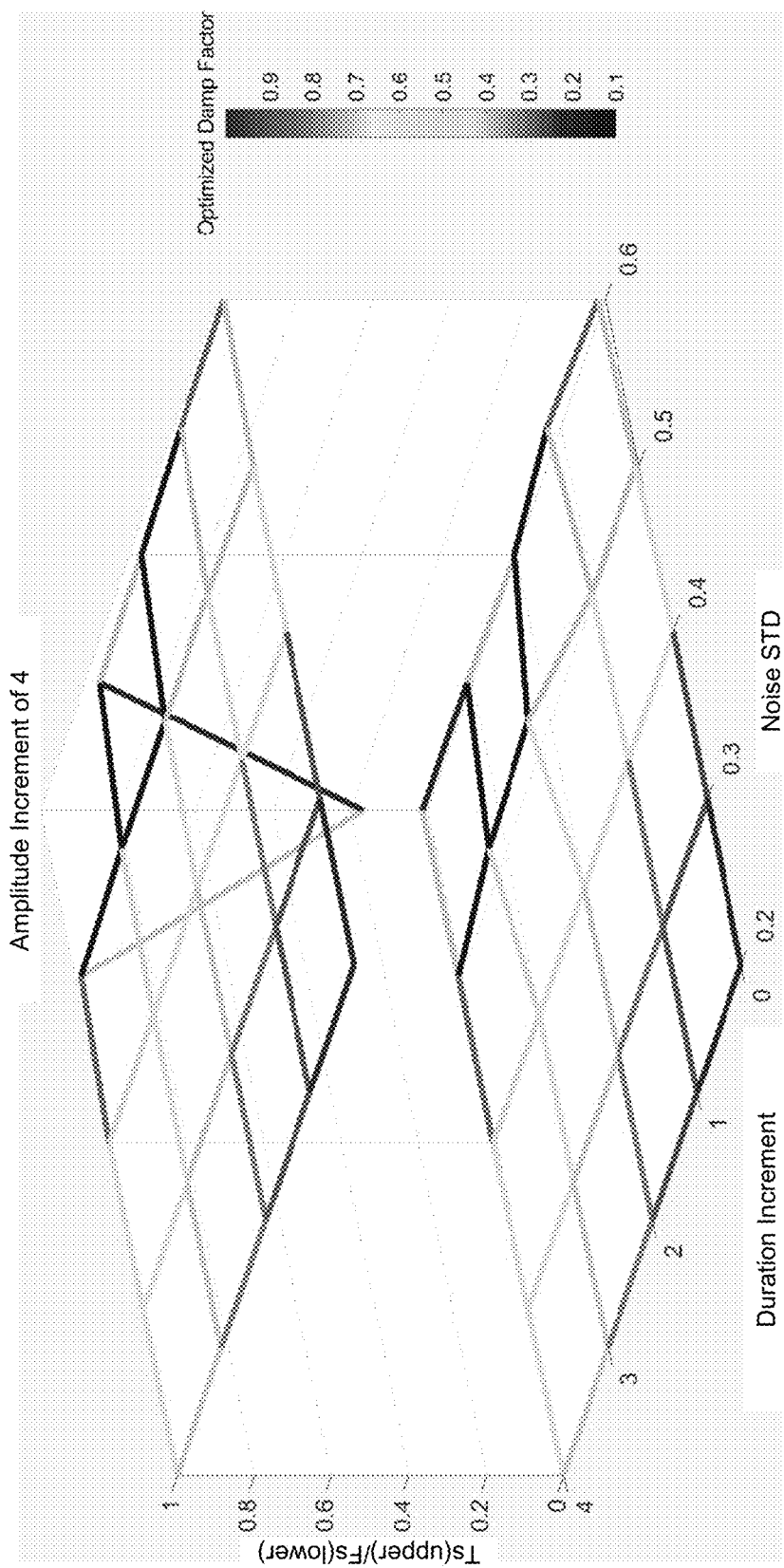

FIG. 4B illustrates an example where the spikes become less prominent, where the amplitude increment is 4 points. At the near corner of the graph, the Ts and Fs can still reach 100% and 0% respectively with a DF value of less than 1.0, while at the far corner the surface of Ts starts to drop even when the DF is lowered to 0.1; accordingly, the far corner of the surface of Fs starts to hump. Hence, FIG. 4B shows that if spikes are not prominent and/or narrow enough, signal noise and wide spikes will affect the performance of a spike-detection technique, which does not use an optimized damping factor.

Figure 4C:
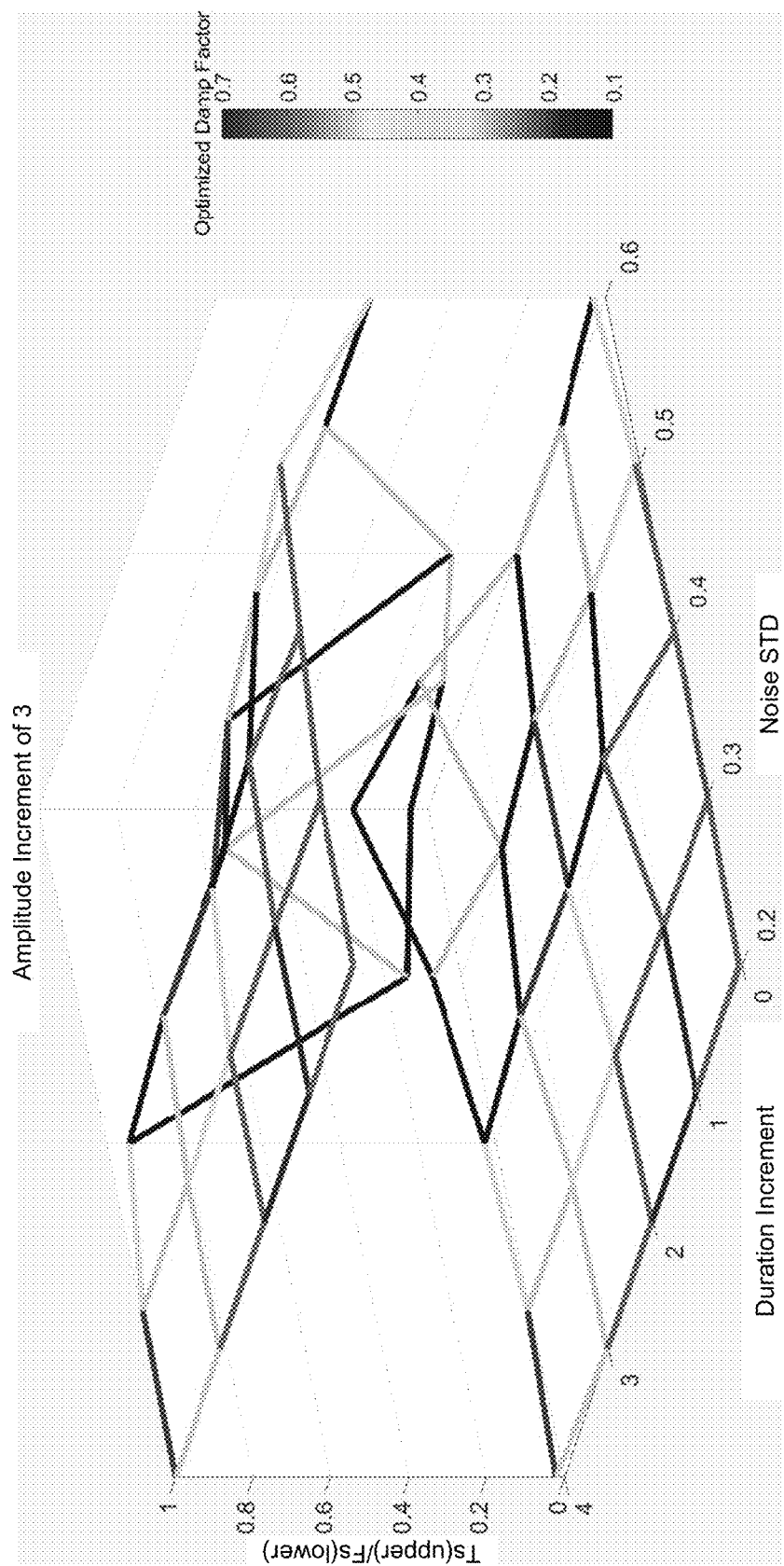
Figure 4D:
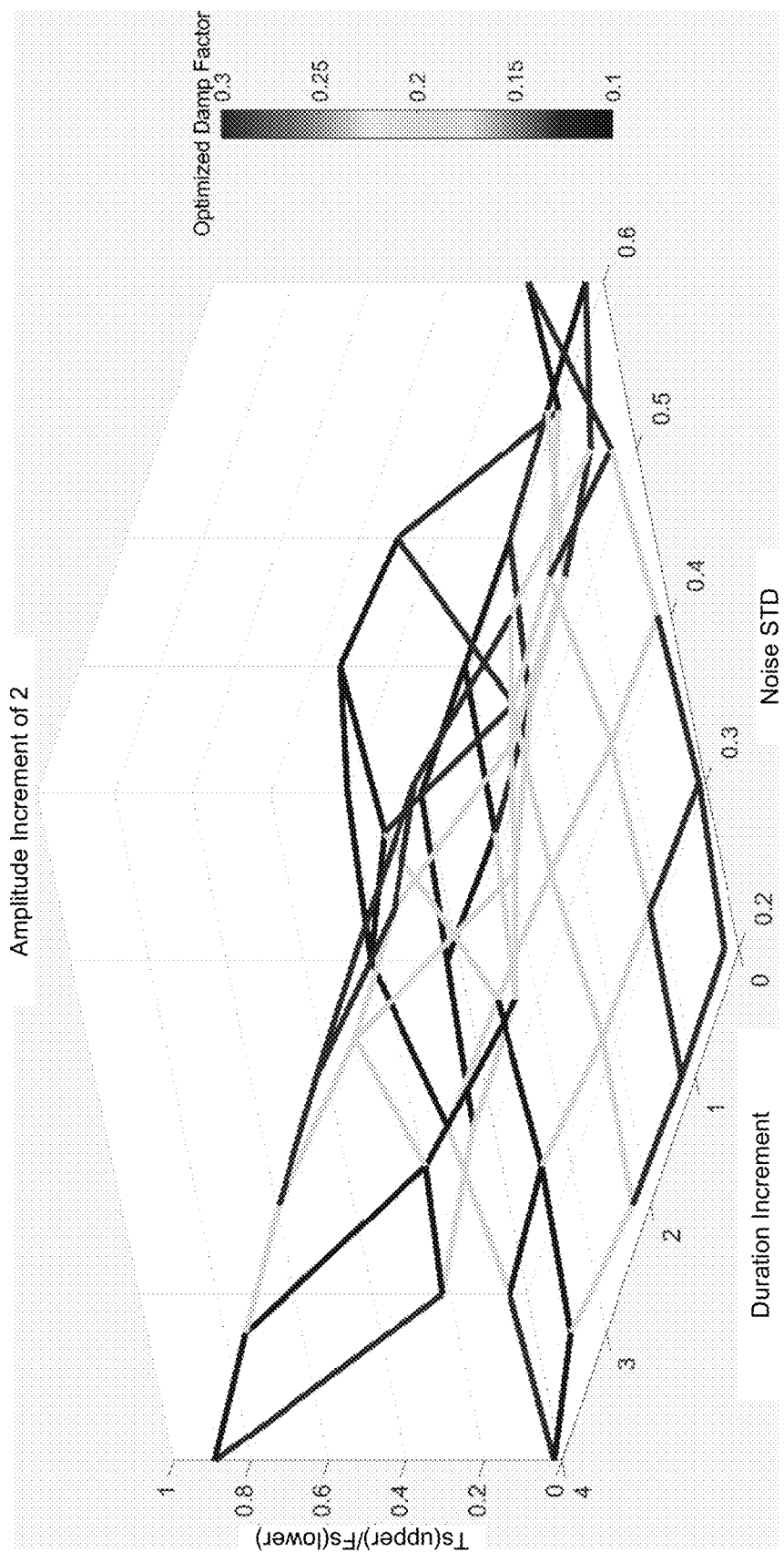

FIG. 4C illustrates the case where the amplitude increment is 3 points, which further reduces the spike height and causes more regions of the Ts to collapse and more regions of the Fs to hump. Finally, FIG. 4D illustrates the case where the amplitude increment is 2 points, which provides an extreme example where the spike height is short enough to hide behind the signal noise, causing suboptimal spike detection.

Note that in most real-world applications, a time-series dataset will contain no "ground truth" signals that define exactly where real spikes exist in each signal. It is consequently impossible to use conventional techniques to fully validate a spike-detection technique in terms of Ts and Fs. Moreover, it is not possible to select an appropriate DF ahead of time, because if we simply vary DF and identify a different number of spikes each time we change DF, we have no way to know which detected spikes are associated with Ts and which detected spikes are associated with Fs.

Figure 5A:
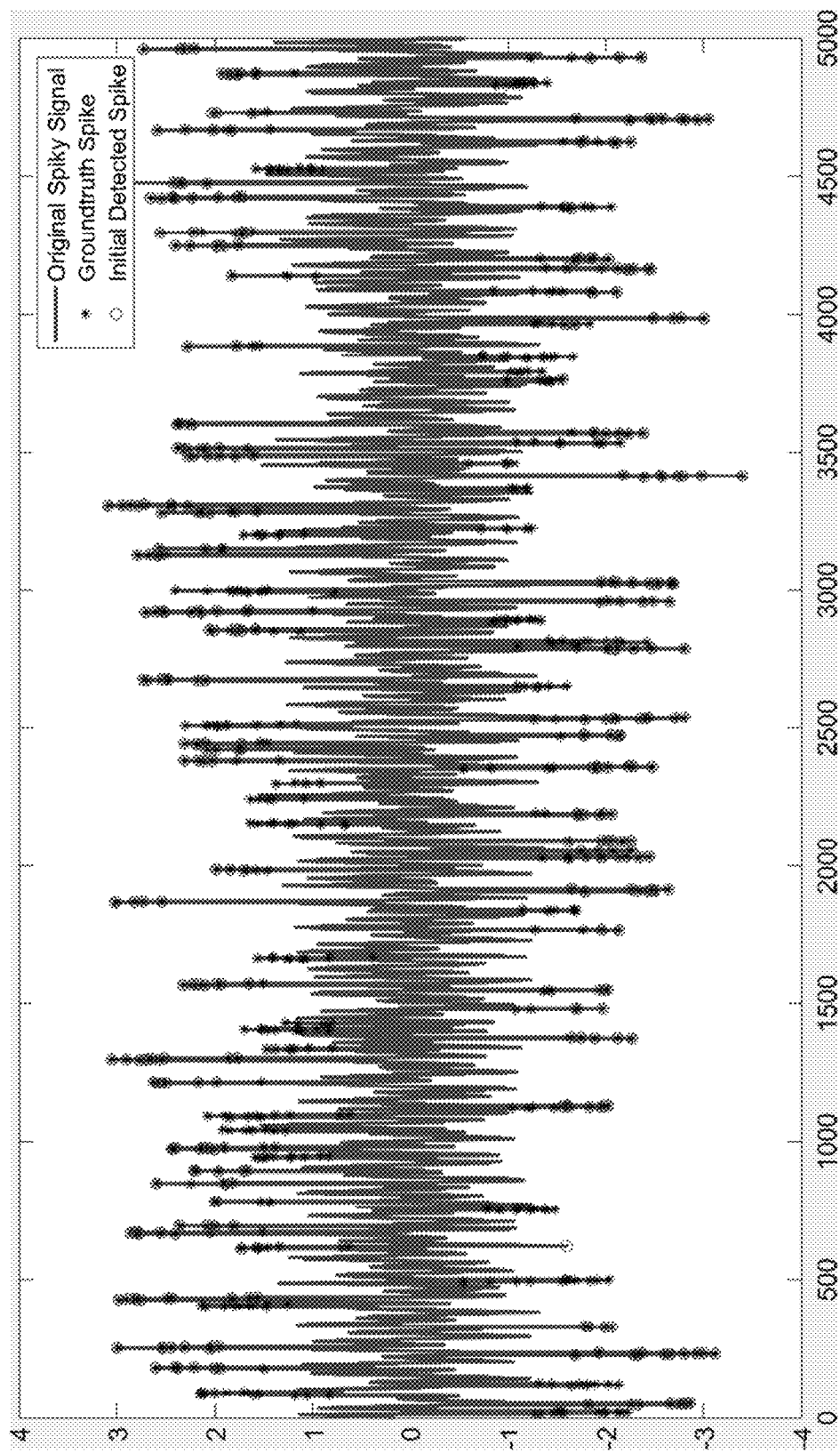
FIG. 5A illustrates an original spiky signal highlighting ground truth spikes and spikes detected using a suboptimal DF in accordance with the disclosed embodiments.
Figure 5B:
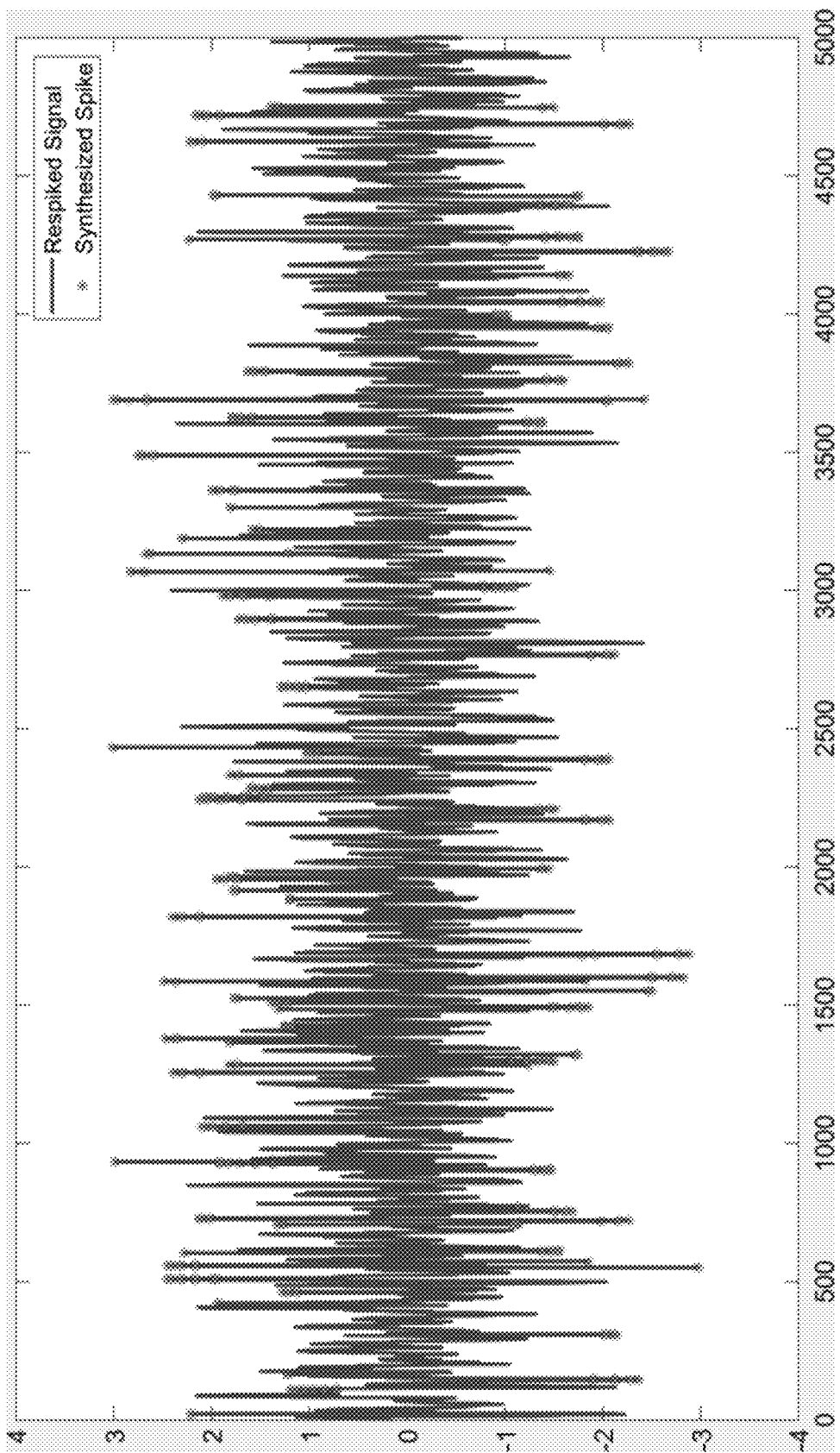
FIG. 5B illustrates a respiked synthetic signal in accordance with the disclosed embodiments.
Figure 5C:
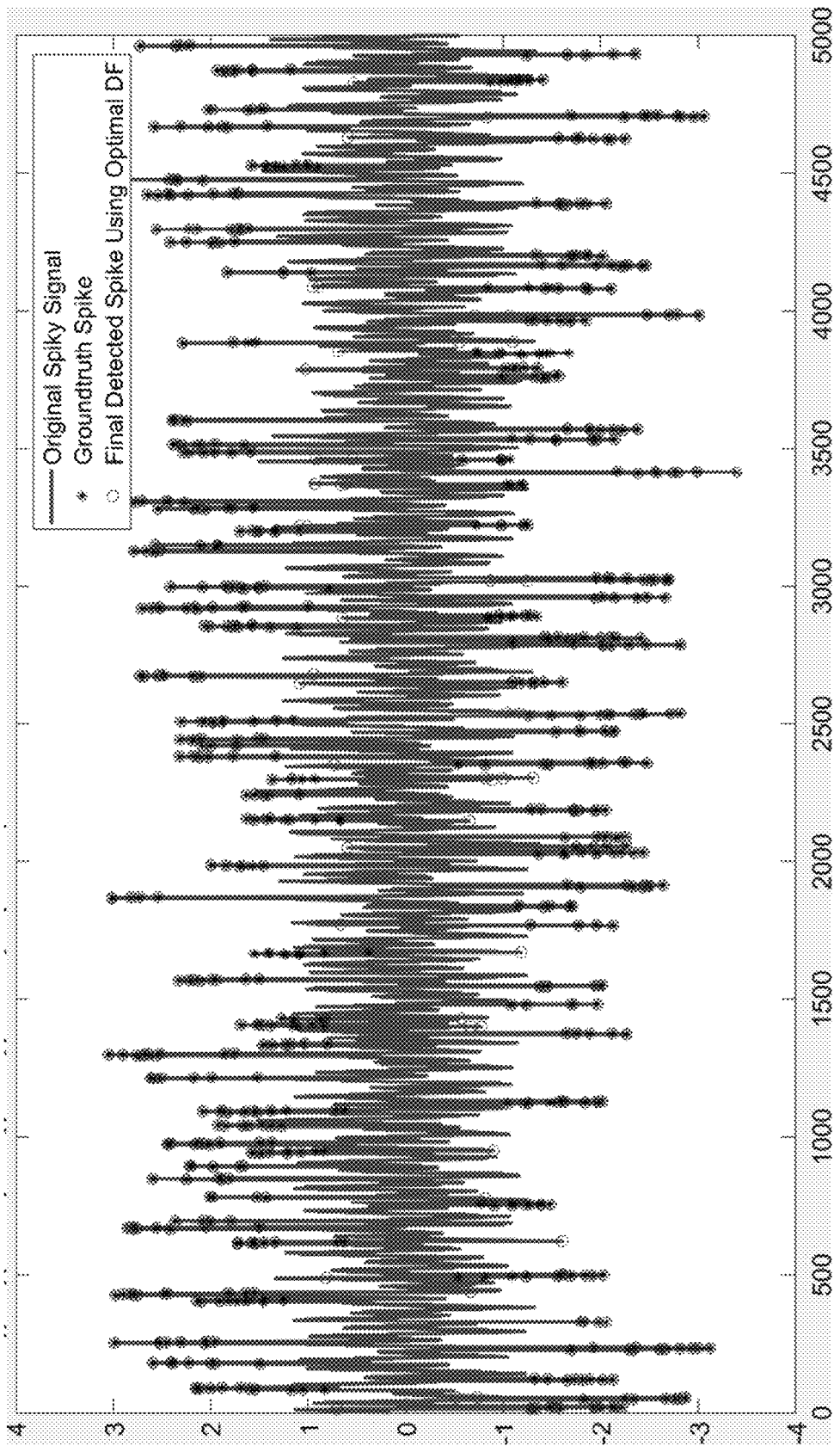
FIG. 5C illustrates the original spiky signal highlighting ground truth spikes and spikes detected using an optimized DF value in accordance with the disclosed embodiments.

Our spike-detection technique makes use of an iterative process, which enables us to determine a nearly optimal DF, even though the original dataset of time-series signals does not have any "ground truth" labeling of spikes. We start the first iteration of the process with an original set of measured spiky signals as illustrated in FIG. 5A. We then perform an initial spike-detection operation with an "initial guess" for the optimal DF value, and then extract the identified spikes to produce a despiked signal. Next, we take those extracted spikes and expand/contract their characteristic metrics by ±10% of the range of the measured spike heights, widths, and inter-arrival times (IATs). We then generate "ground truth" spikes by sampling from the newly expanded/contracted distributions. Next, we use the generated spikes to seed the despiked signal to produce a "ground truth" signal as is illustrated in FIG. 5B. This ground truth signal is then used to optimize DF as a function of spike height, width, and inter-arrival times following the procedures introduced in "SimSpike". Finally, we perform spike-detection on the original spiky signal again using the optimized DF value and capture more ground truth spikes than during the initial iteration as is illustrated in FIG. 5C.

Note that this new spike-detection technique works better than the existing techniques if the spikes have different characteristics. In cases where the signals originate from the same types of systems where spike "shapes" are relatively similar, our new technique performs even better.

Figure 6A:
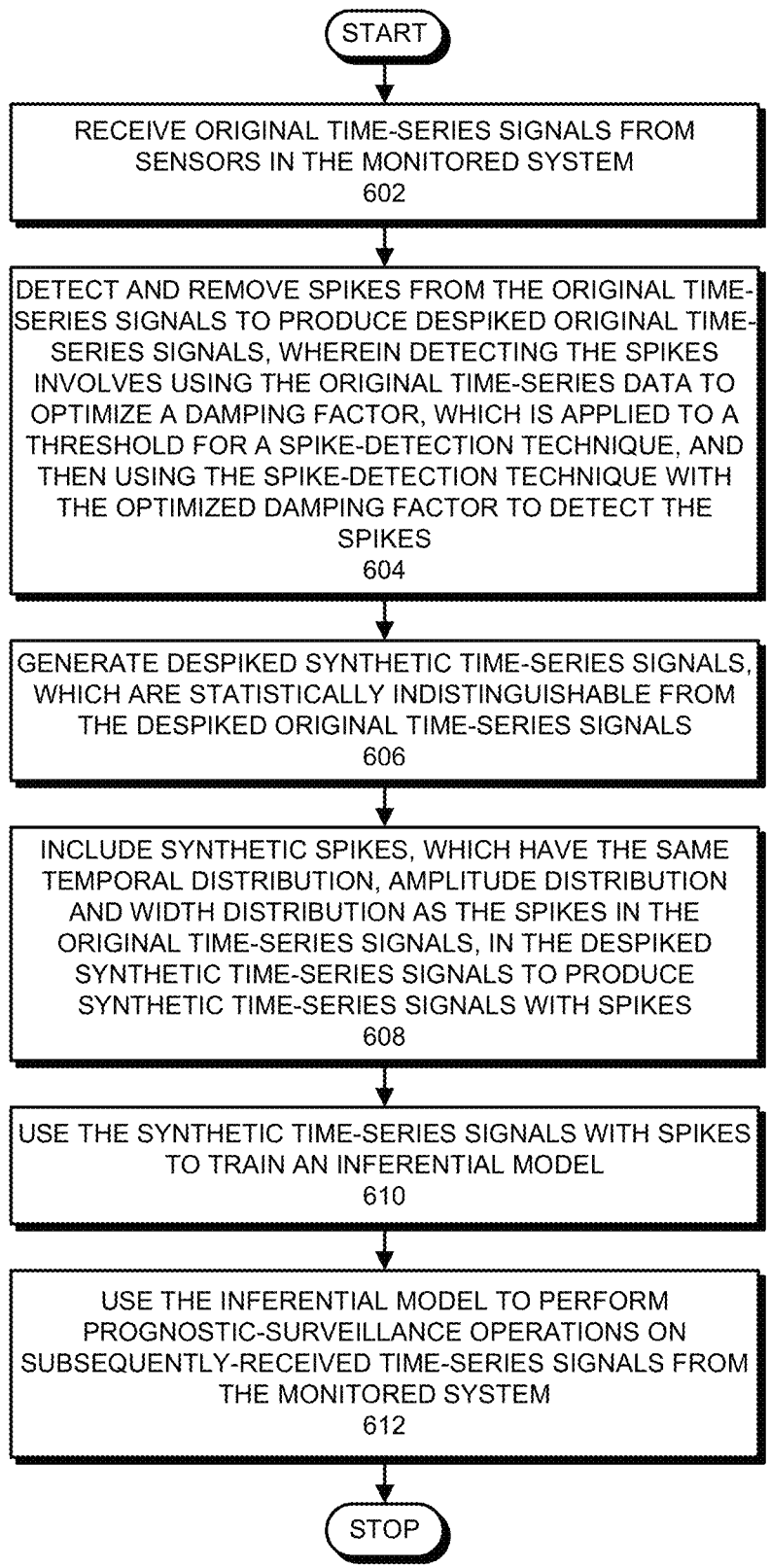
FIG. 6A presents a flow chart illustrating operations involved in synthesizing high-fidelity signals with spikes for prognostic-surveillance operations in accordance with the disclosed embodiments.
Figure 6B:
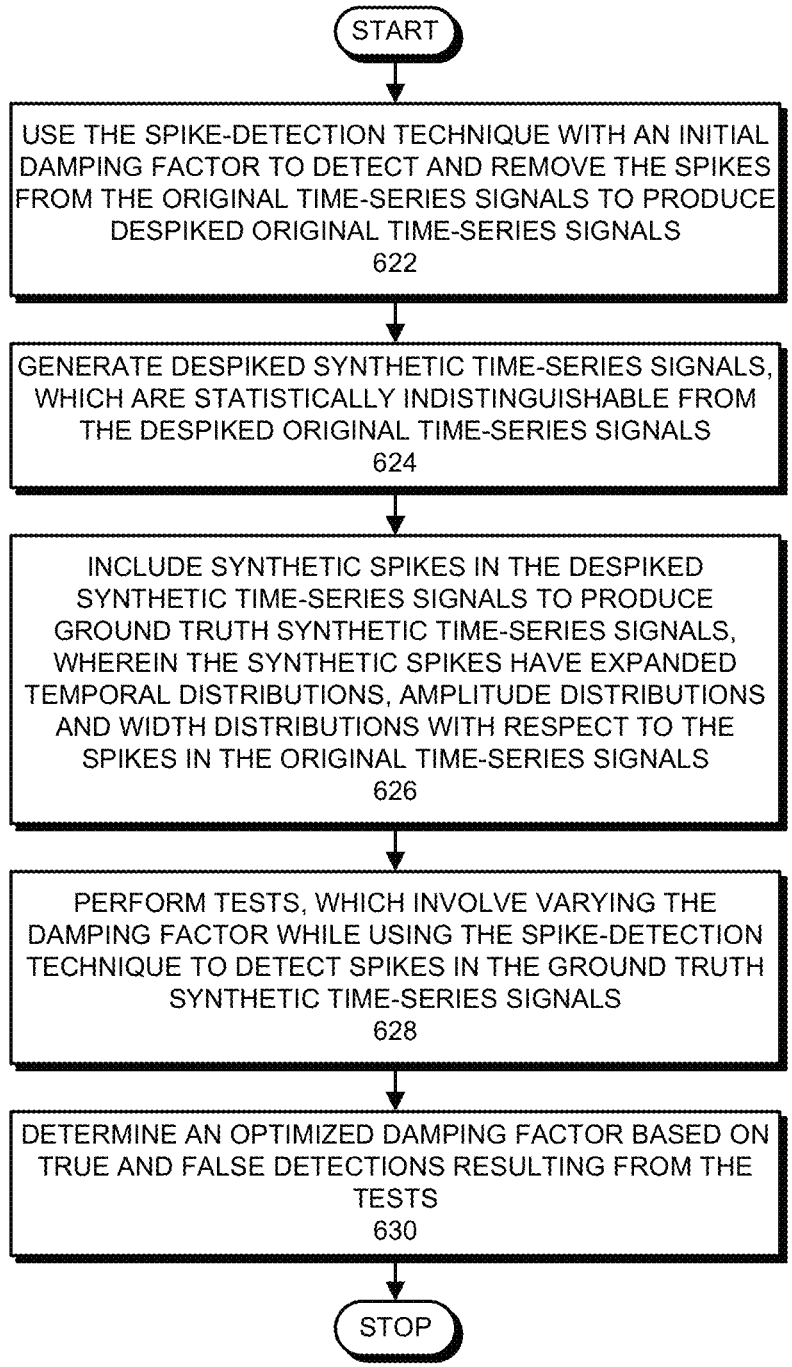
FIG. 6B presents a flow chart illustrating operations involved in optimizing a damping factor for a spike-detection technique in accordance with the disclosed embodiments

We next describe additional details about using our new spike-detection technique with reference to the flow charts in FIGS. 6A-6B to produce synthetic signals, which are used to perform prognostic-surveillance operations.

Generating Synthetic Time-Series Signals

FIG. 6A presents a flow chart illustrating operations performed by a system while synthesizing high-fidelity signals with spikes for prognostic-surveillance operations in accordance with the disclosed embodiments. During operation, the system receives original time-series signals from sensors in the monitored system (step 602). Next, the system detects and removes spikes from the original time-series signals to produce despiked original time-series signals, wherein detecting the spikes involves using the original time-series data to optimize a damping factor, which is applied to a threshold for a spike-detection technique, and then using the spike-detection technique with the optimized damping factor to detect the spikes (step 604). The system then generates despiked synthetic time-series signals, which are statistically indistinguishable from the despiked original time-series signals (step 606). Next, the system includes synthetic spikes, which have the same temporal distribution, amplitude distribution and width distribution as the spikes in the original time-series signals, in the despiked synthetic time-series signals to produce synthetic time-series signals with spikes (step 608). The system then uses the synthetic time-series signals with spikes to train an inferential model (step 610), and uses the inferential model to perform prognostic-surveillance operations on subsequently-received time-series signals from the monitored system (step 612).

FIG. 6B presents a flow chart illustrating operations performed by a system while optimizing a damping factor for a spike-detection technique in accordance with the disclosed embodiments. (This flow chart illustrates in more detail some of the operations performed in step 604 in the flow chart in FIG. 6A.) First, the system uses the spike-detection technique with an initial damping factor to detect and remove the spikes from the original time-series signals to produce despiked original time-series signals (step 622). Next, the system generates despiked synthetic time-series signals, which are statistically indistinguishable from the despiked original time-series signals (step 624). The system then includes synthetic spikes in the despiked synthetic time-series signals to produce ground truth synthetic time-series signals, wherein the synthetic spikes have slightly expanded and contracted temporal distributions, amplitude distributions and width distributions with respect to the spikes in the original time-series signals (step 626). Next, the system performs tests, which involve varying the damping factor while using the spike-detection technique to detect spikes in the ground truth synthetic time-series signals (step 628). Finally, the system determines an optimized damping factor based on true and false detections resulting from the tests (step 630).

Empirical Results

Figure 7A:
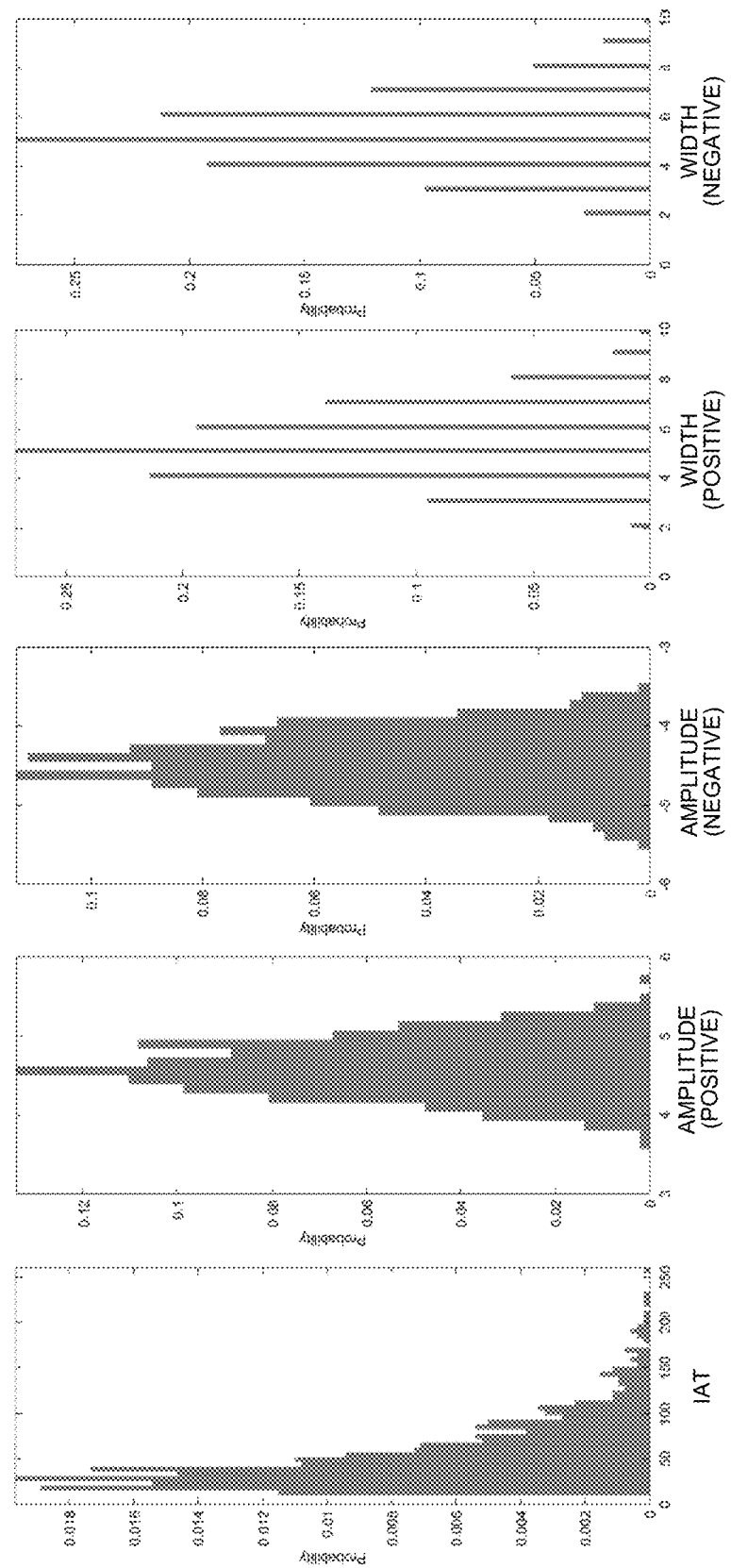
FIGS. 7A and 7B present empirical results, summarized as histogram plots demonstrating the capabilities of the new system.
Figure 7B:
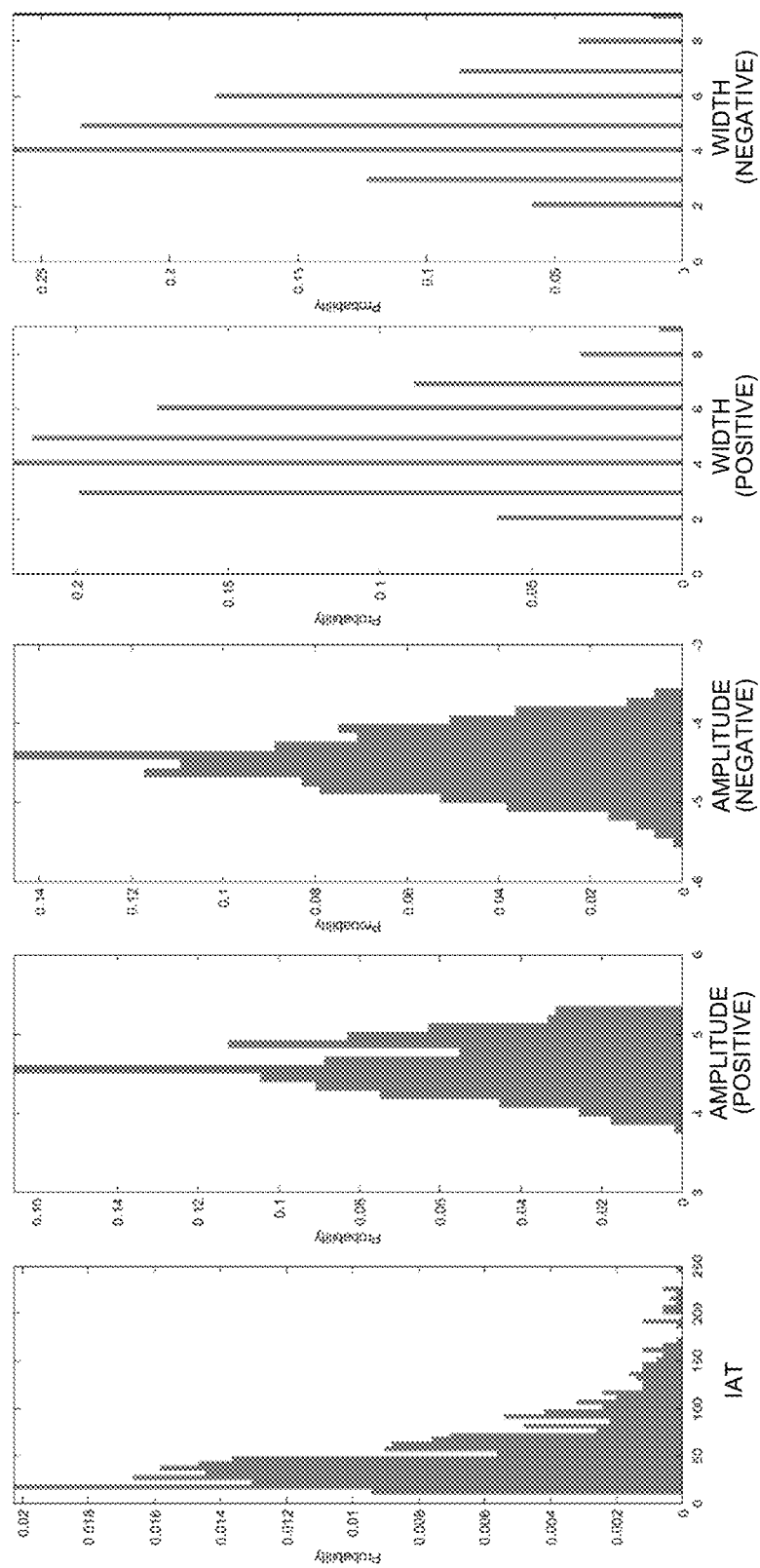

To demonstrate the capabilities of the new system, we present empirical results, which are summarized as histogram plots in FIGS. 7A and 7B, to facilitate a side-by-side comparison of spike characteristics for both original and synthesized signals. FIG. 7A illustrates distributions of spike characteristics for both negative and positive spikes that were detected and removed from original time-series signals. During the despiking process, to compute the width of the spikes that are identified for removal, we use the full width at half maximum (FWHM) metric, which is defined as the width of a spike at exactly one-half of its peak amplitude. To determine the amplitude of the spikes, we replace the detected spiky points by interpolating the nearest non-spiky neighbors and then subtract spiky points from the interpolated baseline. During the respiking process, we generate an empirical distribution of spike characteristics through a cumulative density function (CDF)-based approach to produce synthesized spikes. Finally, the synthesized spikes are seeded into the reconstructed signals in a manner that matches the spike distributions on the raw measured signals for amplitudes, widths, and IATs. The characteristics of these synthesized spikes are summarized in the histogram plots that appear in FIG. 7B for both negative and positive spikes.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing prognostic-surveillance operations on a monitored system, comprising:
    receiving original time-series signals from sensors in the monitored system;
    detecting and removing spikes from the original time-series signals to produce despiked original time-series signals, wherein detecting the spikes involves,
        using the original time-series data to optimize a damping factor, which is applied to a threshold for a spike-detection technique, and
        using the spike-detection technique with the optimized damping factor to detect the spikes;
    generating despiked synthetic time-series signals, which are statistically indistinguishable from the despiked original time-series signals;
    including synthetic spikes, which have the same temporal distribution, amplitude distribution and width distribution as the spikes in the original time-series signals, in the despiked synthetic time-series signals to produce synthetic time-series signals with spikes;
using the synthetic time-series signals with spikes to train an inferential model; and
using the inferential model to perform prognostic-surveillance operations on subsequently-received time-series signals from the monitored system.

2. The method of claim 1, wherein optimizing the damping factor comprises:
using the spike-detection technique with an initial damping factor to detect and remove the spikes from the original time-series signals to produce despiked original time-series signals;
generating despiked synthetic time-series signals, which are statistically indistinguishable from the despiked original time-series signals;
including synthetic spikes in the despiked synthetic time-series signals to produce ground truth synthetic time-series signals, wherein the synthetic spikes have expanded and contracted temporal distributions, amplitude distributions and width distributions with respect to the spikes in the original time-series signals;
performing tests, which involve varying the damping factor while using the spike-detection technique to detect spikes in the ground truth synthetic time-series signals; and
determining an optimized damping factor based on true and false detections resulting from the tests.

3. The method of claim 1, wherein the spike-detection technique comprises one of the following:
a phase-space thresholding technique, which uses a phase-space-related threshold;
an acceleration-thresholding technique, which uses an acceleration threshold; and
a wavelet-thresholding technique, which uses a wavelet-space-related threshold.

4. The method of claim 1, wherein generating the despiked synthetic time-series signals includes:
decomposing the despiked original time-series signals into deterministic and stochastic components; and
using the deterministic and stochastic components to produce the despiked synthetic time-series signals.

5. The method of claim 1, wherein the despiked synthetic time-series signals have the same serial-correlation structure, cross-correlation structure, and stochastic content as the despiked original time-series signals.

6. The method of claim 5, wherein the stochastic content includes one or more of the following:
a mean;
a variance;
a skewness;
a kurtosis; and
Kolmogorov-Smirnov test statistics.

7. The method of claim 1, wherein generating the despiked synthetic time-series signals involves using a telemetry parameter synthesis (TPSS) technique, which creates a high-fidelity synthesis equation, and then uses the high-fidelity synthesis equation to produce the despiked synthetic time-series signals.

8. The method of claim 7, wherein using the TPSS technique to generate the despiked synthetic time-series signals includes:
using an autocorrelation technique to determine a longest period for each signal in the despiked original time-series signals;
selecting a portion of the despiked original time-series signals that contains an integer number of periods;
determining a number of Fourier modes $N_{mode}$, which equals a number of peaks in a spectral-density function for the despiked original time-series signals;
selecting the maximum $N_{mode}$ Fourier modes; and
using the selected $N_{mode}$ Fourier modes to produce the despiked synthetic time-series signals.

9. The method of claim 1, wherein using the inferential model to perform prognostic-surveillance operations on the subsequently-received time-series signals comprises:
using the prognostic inferential model to generate estimated values for the subsequently-received time-series sensor data;
performing a pairwise differencing operation between actual values and the estimated values for the subsequently-received time-series sensor data to produce residuals; and
performing a sequential probability ratio test (SPRT) on the residuals to detect the incipient anomalies.

10. The method of claim 9, wherein detecting the incipient anomalies comprises detecting one or more of the following:
an impending failure of the monitored system; and
a malicious-intrusion event in the monitored system.

11. A non-transitory computer-readable storage medium storing instructions that when executed by a computer cause the computer to perform a method for performing prognostic-surveillance operations on a monitored system, the method comprising:
receiving original time-series signals from sensors in the monitored system;
detecting and removing spikes from the original time-series signals to produce despiked original time-series signals, wherein detecting the spikes involves,
using the original time-series data to optimize a damping factor, which is applied to a threshold for a spike-detection technique, and
using the spike-detection technique with the optimized damping factor to detect the spikes;
generating despiked synthetic time-series signals, which are statistically indistinguishable from the despiked original time-series signals;
including synthetic spikes, which have the same temporal distribution, amplitude distribution and width distribution as the spikes in the original time-series signals, in the despiked synthetic time-series signals to produce synthetic time-series signals with spikes;
using the synthetic time-series signals with spikes to train an inferential model; and
using the inferential model to perform prognostic-surveillance operations on subsequently-received time-series signals from the monitored system.

12. The non-transitory computer-readable storage medium of claim 11, wherein optimizing the damping factor comprises:
using the spike-detection technique with an initial damping factor to detect and remove the spikes from the original time-series signals to produce despiked original time-series signals;
generating despiked synthetic time-series signals, which are statistically indistinguishable from the despiked original time-series signals;
including synthetic spikes in the despiked synthetic time-series signals to produce ground truth synthetic time-series signals, wherein the synthetic spikes have expanded and contracted temporal distributions, amplitude distributions and width distributions with respect to the spikes in the original time-series signals;

performing tests, which involve varying the damping factor while using the spike-detection technique to detect spikes in the ground truth synthetic time-series signals; and determining an optimized damping factor based on true and false detections resulting from the tests.

13. The non-transitory computer-readable storage medium of claim 11, wherein the spike-detection technique comprises one of the following:

a phase-space thresholding technique, which uses a phase-space-related threshold;

an acceleration-thresholding technique, which uses an acceleration threshold; and a wavelet-thresholding technique, which uses a wavelet-space-related threshold.

14. The non-transitory computer-readable storage medium of claim 11, wherein generating the despiked synthetic time-series signals includes:

decomposing the despiked original time-series signals into deterministic and stochastic components; and using the deterministic and stochastic components to produce the despiked synthetic time-series signals.

15. The non-transitory computer-readable storage medium of claim 11, wherein the despiked synthetic time-series signals have the same serial-correlation structure, cross-correlation structure, and stochastic content as the despiked original time-series signals.

16. The non-transitory computer-readable storage medium of claim 11, wherein generating the despiked synthetic time-series signals involves using a telemetry parameter synthesis (TPSS) technique, which creates a high-fidelity synthesis equation, and then uses the high-fidelity synthesis equation to produce the despiked synthetic time-series signals.

17. The non-transitory computer-readable storage medium of claim 11, wherein using the inferential model to perform prognostic-surveillance operations on the subsequently-received time-series signals comprises:

using the prognostic inferential model to generate estimated values for the subsequently-received time-series sensor data;

performing a pairwise differencing operation between actual values and the estimated values for the subsequently-received time-series sensor data to produce residuals; and performing a sequential probability ratio test (SPRT) on the residuals to detect the incipient anomalies.

18. The non-transitory computer-readable storage medium of claim 17, wherein detecting the incipient anomalies comprises detecting one or more of the following:

an impending failure of the monitored system; and a malicious-intrusion event in the monitored system.

19. A system that performs prognostic-surveillance operations on a monitored system, comprising:

at least one processor and at least one associated memory; and a prognostic-surveillance mechanism that executes on the at least one processor, wherein during operation, the prognostic-surveillance mechanism:

receives original time-series signals from sensors in the monitored system;

detects and removes spikes from the original time-series signals to produce despiked original time-series signals, wherein while detecting the spikes, the prognostic-surveillance mechanism, uses the original time-series data to optimize a damping factor, which is applied to a threshold for a spike-detection technique, and uses the spike-detection technique with the optimized damping factor to detect the spikes;

generates despiked synthetic time-series signals, which are statistically indistinguishable from the despiked original time-series signals;

includes synthetic spikes, which have the same temporal distribution, amplitude distribution and width distribution as the spikes in the original time-series signals, in the despiked synthetic time-series signals to produce synthetic time-series signals with spikes;

uses the synthetic time-series signals with spikes to train an inferential model; and uses the inferential model to perform prognostic-surveillance operations on subsequently-received time-series signals from the monitored system.

20. The system of claim 19, wherein while optimizing the damping factor, the prognostic-surveillance mechanism:

uses the spike-detection technique with an initial damping factor to detect and remove the spikes from the original time-series signals to produce despiked original time-series signals;

generates despiked synthetic time-series signals, which are statistically indistinguishable from the despiked original time-series signals;

includes synthetic spikes in the despiked synthetic time-series signals to produce ground truth synthetic time-series signals, wherein the synthetic spikes have expanded and contracted temporal distributions, amplitude distributions and width distributions with respect to the spikes in the original time-series signals;

performs tests, which involve varying the damping factor while using the spike-detection technique to detect spikes in the ground truth synthetic time-series signals; and determines an optimized damping factor based on true and false detections resulting from the tests.

* * * * *